United States Patent Office 3,506,461
Patented Apr. 14, 1970

3,506,461
APPARATUS FOR CONTINUOUSLY REFINING COCOA NIBS AND LIKE MATERIAL
Rüdiger Noschinski, Frankfurt am Main, and Joachim Tuckmantel, Massenheim, Germany, assignors to Maschinenfabrik J. S. Petzholdt, Frankfurt am Main, Germany
Filed Feb. 13, 1968, Ser. No. 705,168
Claims priority, application Germany, Feb. 15, 1967, M 72,775
Int. Cl. A23g 1/06
U.S. Cl. 99—236                7 Claims

ABSTRACT OF THE DISCLOSURE

A refining apparatus for cocoa nibs comprises two liquefying containers alternately receiving dry cocoa nibs and the liquefied material is continuously pumped to an adjacent refining container, a stream of refined material being continuously removed from the apparatus.

BACKGROUND AND SUMMARY OF THE INVENTION

The present invention relates to an apparatus for mixing, liquefying and refining cocoa nibs and like materials.

In the preparation of chocolate masses, the necessary treatments of the cocoa beans has been effected in batch operations, which has serious economic drawbacks. Continuously operating refining apparatus has also been proposed but the quality of the resultant chocolate mass produced in such known apparatus has been low so that the industrial use of such machinery has found little acceptance, particularly in the production of quality chocolate.

It is a primary object of the present invention to overcome the disadvantages of these conventional processes, and to produce high-quality chocolate and other refined materials by mixing, liquefying and refining them in a continuous stream to improve and intensify the aroma of the final product.

The above and other objects are accomplished in accordance with this invention in a refining apparatus comprising a plurality of containers wherein the material is mixed, liquefied and refined. A feeding means is provided for continuously feeding a stream of the material alternately to one of two liquefying containers arranged adjacent the feeding means. At least one additional container is arranged immediately adjacent the two like liquefying containers. The two liquefying containers are connected to the additional container or containers by material conduit means, and a pump is mounted in the material conduit means between each like container and the immediately adjacent additional container for moving the liquefied material thereinto. Material stirring means is mounted in each container, and valve means are arranged in the material conduit means for directing the material in a desired circuit. A spraying means is arranged in the additional container for aerating the liquefied material therein, and output means continuously removes a stream of the liquefied and refined material from a last one of the containers.

According to a preferred embodiment, the containers are of circular cross section and are in tangential contact with the adjacent containers. Also, preferably, the stirring means in the refining containers and in the final or collecting container are operated by a common drive. Cross bars may extend over at least two of the containers to support the drives for the stirring means and/or spraying means on top of the containers. The spraying means may comprise a standpipe having an inlet and an outlet, the pump delivers the liquefied material from the liquefying container to the inlet of the standpipe, and a spray disc is arranged at the outlet of the standpipe. A valve is then arranged in the material conduit means between the pump and the standpipe inlet.

In the arrangement of the invention, the implements needed to first treat by tumbling and then to refine the material are not mounted in a single treatment vessel, as heretofore, but in successive containers so that each implement may be most suitably constructed best to fulfill its functions.

The containers have jacketted walls through which warm water or other heating fluid is circulated to control their temperature, and the stirring means in the containers continuously mix the material therein so that it is liquefied and remains liquefied.

A conduit system connects the liquefying containers with the refining containers at their respective bottoms, and a valve means in the conduit system enables the flow of liquefied material to be directed to the desired container and/or to recirculate the material through the refining container, and then to a collecting container.

BRIEF DESCRIPTION OF DRAWING

The above and other objects, advantages and features of the present invention will become more apparent in the following detailed description of a now preferred embodiment thereof, taken in conjunction with the accompanying drawing wherein.

DETAILED DESCRIPTION

Figure 1:
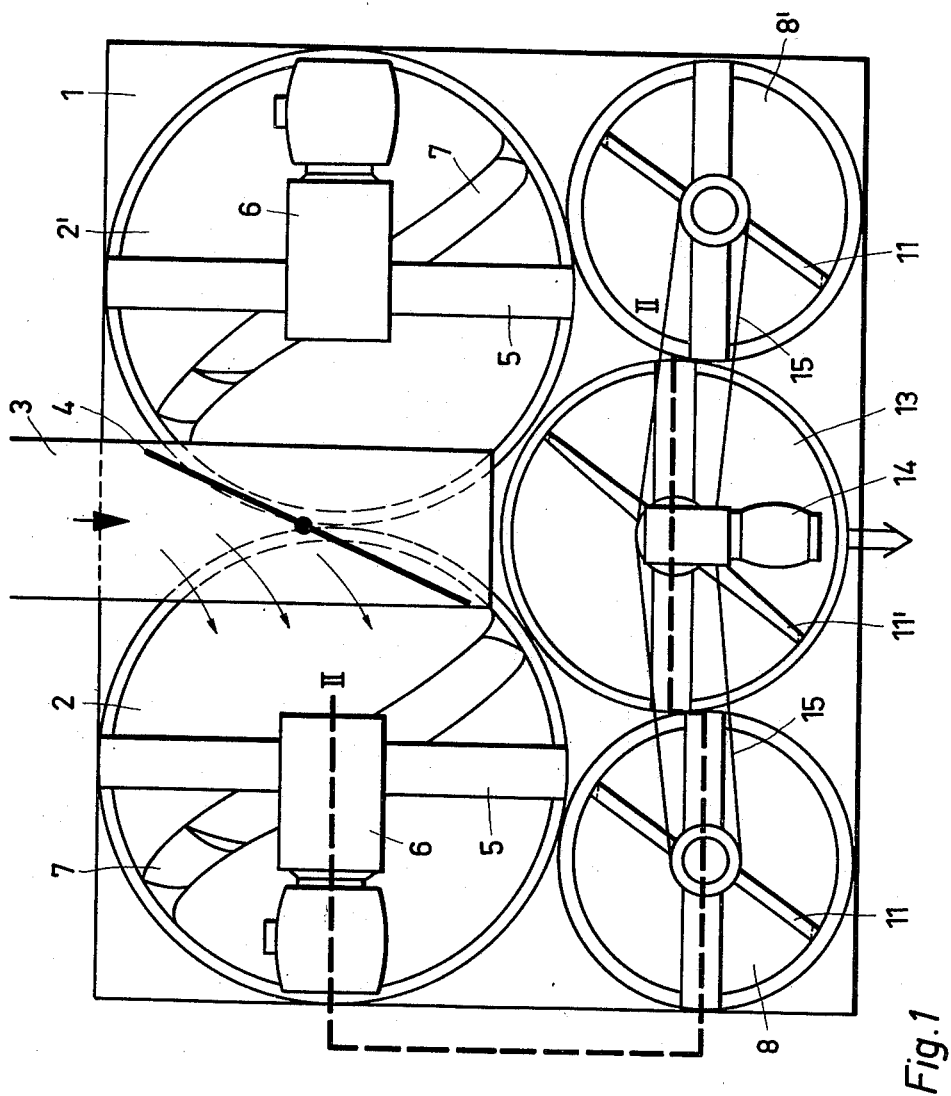
FIG. 1 is a schematic top view showing one embodiment of the apparatus according to this invention.

Referring now to the drawing wherein like reference numerals designate like parts in all figures, the containers of the apparatus are shown to be of circular cross section and to be arranged in tangentially contacting position on a support base 1. As shown, two like liquefying containers 2, 2' are mounted side by side adjacent a feeding means 3 arranged centrally therebetween. These temperature-controllable containers are surrounded by jackets 2a and may, for instance, have a capacity of 1,400 kilograms of material and are shown to have the largest diameter of all the containers. The feeding means is preferably constituted as a conveyor band on which the material to be fed to the containers 2, 2' may be weighed, a tiltable baffle 4 being so mounted that the material may be directed selectively to one or the other of these containers. A drive motor 24 (see FIG. 4) is arranged to tilt the baffle in either of its operative positions.

Figure 4:
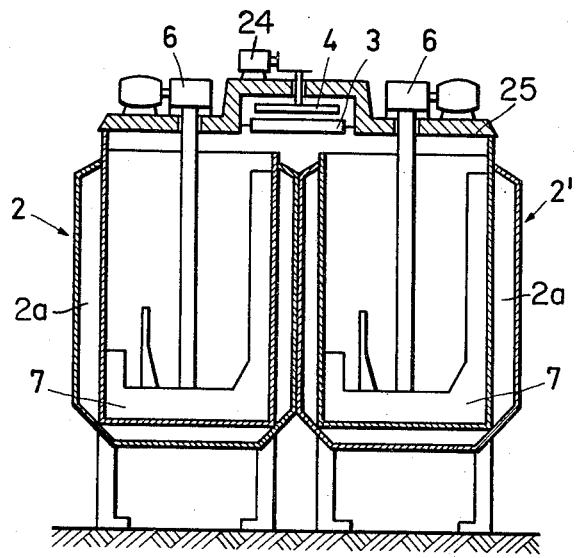
FIG. 4 is a vertical cross section of the liquefying containers of the apparatus, showing the common cross bar supporting the drives for their stirring means.

Each stirring means 7 in the containers 2, 2' is driven by a respective drive 6 mounted on a common cross bar 25 supported on cross bars 5' extending over both containers (see FIG. 4). Since the material fed into these containers is only liquefied therein and not aerated or sprayed, it is possible to drive the stirring means from above. However, some aeration of the material results from the constant stirring thereof by the arms of the stirring means, supported by the frictional heat developed thereby.

Figure 2:
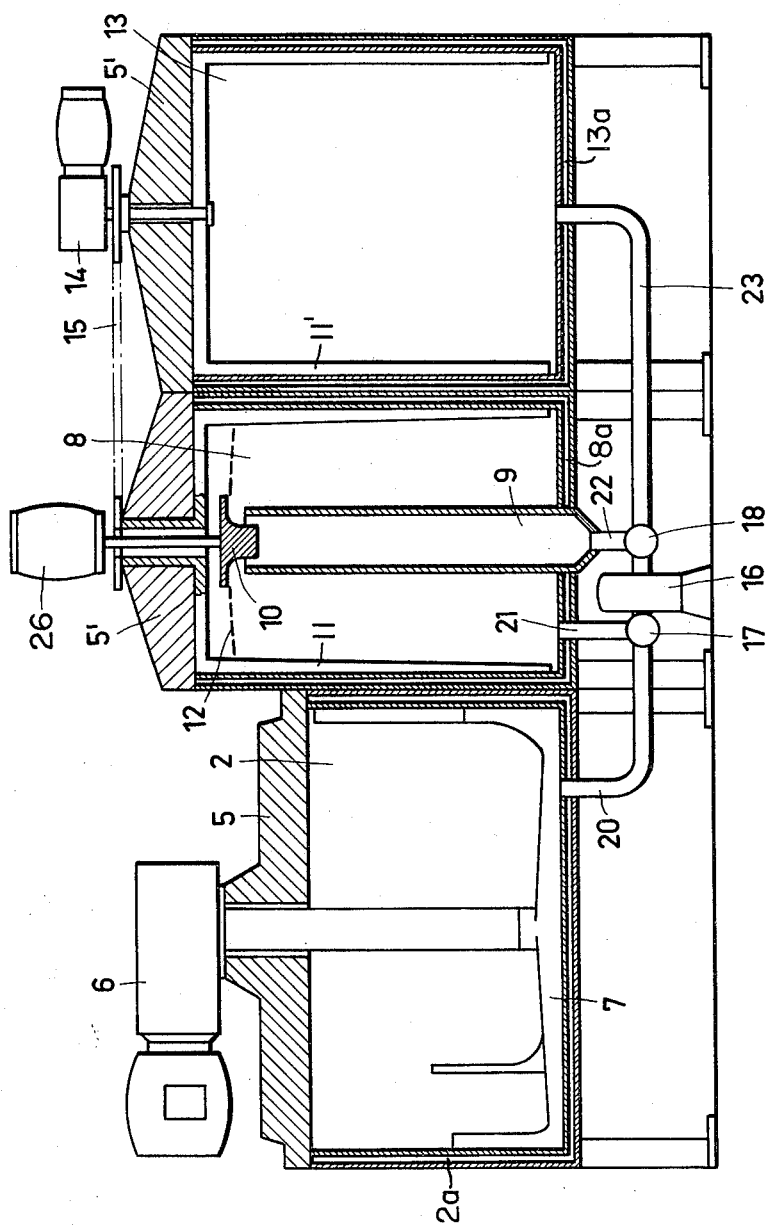
FIG. 2 is a schematic and simplified section along line II—II of FIG. 1.

In the illustrated embodiment, an additional refining container is associated with each liquefying container, the additional containers 8, 8' being also temperature-controllable by means of jackets 8a and having a somewhat smaller diameter. A generally conventional spraying means is mounted in each additional container for aerating the liquefied material delivered thereto from the containers 2, 2'. As shown in FIG. 2, the spraying means includes a standpipe 9 and a rotating spraying disc 10 arranged above the outlet of the standpipe, whereby the liquefied material pumped upwardly into the standpipe is thrown centrifugally against the wall of the container in the form of a mist 12. The disc 10 is rotated by motor 26 supported on cross bars 5'.

Since the liquefied material takes up less space than the dry material fed to the apparatus, the containers 8, 8' may be smaller than containers 2, 2'. As shown, stirring means 11 are also mounted in the refining containers 8, 8' but they need not be as massive as those in the liquefying containers since the liquid material can be stirred more readily. Aeration may be effected in any conventional manner, for instance by introducing air or another suitable gas into the container below the mist 12.

Figure 5:
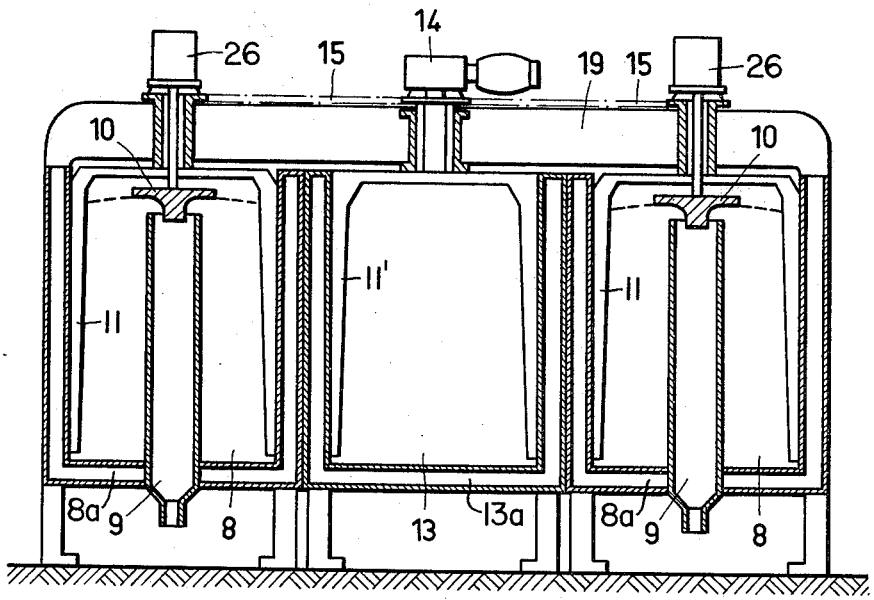
FIG. 5 is a vertical cross section of the refining and aerating containers, as well as the collecting container, showing the common cross bar supporting the drives for the stirring means of these containers.

In the preferred and illustrated embodiment, a collecting container 13 is mounted between the refining containers 8, 8', and the refined material is continuously removed from the apparatus through an output means in this last container. This container is also temperature-controlled by means of jacket 13a and provided with a stirring means 11'. A common drive 14 for the stirring means 11, 11' in the refining containers 8, 8' and the collecting container 13 is mounted on a cross bar 19 (see FIG. 5) extending over the three containers, drive 14 being connected to the stirring means 11 by chains 15, 15. The pump for removing the refined material from container 13 is not shown.

To simplify and clarify the illustration, the material conduit means interconnecting the containers have not been shown in FIG. 1, and the containers 2, 8 and 13 have been shown in FIG. 2 one after the other, roughly along line II—II of FIG. 1. Also, not all implements, such as feeding and stirring means, are shown in all figures.

Figure 3:
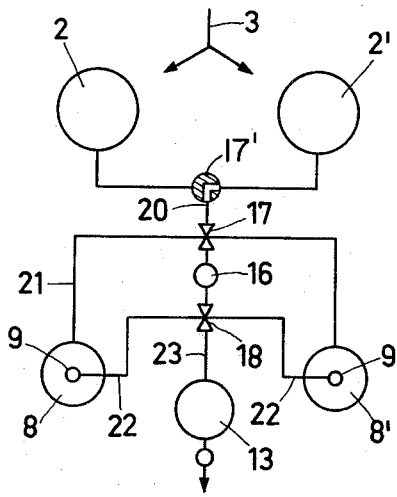
FIG. 3 diagrammatically shows the material conduit system between the containers of the apparatus.

The material conduit means and the operation of the apparatus appears clearly from FIG. 3.

The material to be liquefied and refined, such as cocoa nibs, is delivered into a selected one of the containers 2, 2'. After the selected container is filled, the stirring means therein is actuated to liquefy the material therein while the baffle 4 directs the continuous stream of material into the other container for subsequent liquefication. Within a few minutes, the material in the selected container is liquefied, after which the two-way valve 17' is operated to connect the selected container to conduit 20, and the valve 17 connecting conduits 20 and 21 is opened to enable pump 16 to remove the liquefied material from the selected container. With valve 18 between pump 16 and the intake or standpipe 9 open, the pump delivers the liquefied material into the associated refining container. As soon as the liquefying container has been emptied, the valve 17 is closed so that the liquefied material is recirculated in the refining container by pump 16, being removed from the container through conduit 21 and delivered to the standpipe through conduit 22. After the refining and aerating process is completed in the refining container, the valve 18 is opened to conduit 23 to deliver the refined material to collecting container 13, whence it is continuously removed.

As one of the liquefying containers 2, 2' is filled by operation of baffle 4, the material in the other one is liquefied, and vice versa, thus assuring a continuous flow of liquefied material through respective refining containers 8, 8' into collecting container 13.

Alternatively to the illustrated embodiment, and in an obvious manner, two smaller liquefying containers each having a capacity of, say, 1,200 kilograms may be mounted to receive the material from a feeding means 3, as shown in the drawing, but the liquefied output of the two containers would be successively pumped into a single refining vessel having a capacity of 2,400 kilograms. The smaller containers are again provided with suitable stirring means while the larger container has a conventional refining means including a doctor blade moving along the container wall. The feeding means consists of a conveyor band with a tiltable baffle member for directing the fed material alternatively to one and the other liquefying container. The feeding of each container takes about six hours so that the median dwell time of the material in the liquefying container is nine hours (minimal: 6 hours; maximal: 12 hours). After 12 hours, the liquefied material is automatically pumped into the large refining container whence 1,200 kg. of refined material is pumped every six hours.

While the invention has been described in connection with the refining of cocoa nibs, it may be used for treating like materials requiring similar processing. In the preparation of a chocolate mass, it is also possible, if desired, to add other components, such as cocoa butter, lecithin, etc., to the material in any of the containers in dosed amounts. Obviously, the entire operation may be programmed so that the feeding means, the stirring means, the heating means for the containers, etc. operate in timed sequence and in the desired manner.

What we claim is:

1. A refining apparatus for cocoa nibs and the like material, comprising a plurality of temperature-controlled containers wherein the material is mixed, liquefied and refined to intensify the aroma thereof, a feeding means for continuously feeding a stream of the material, means for selectively directing the material from the feeding means to a first one of a pair of like ones of said containers arranged adjacent the feeding means to receive the material and to liquefy the same, an output means for continuously removing a stream of the liquefied and refined material from a last one of said containers, material stirring means in said containers, material conduit means between successive ones of said containers, and valve means in said conduit means, at least one refining container being arranged immediately adjacent said like containers, a pump in the material conduit means between each like container and immediately adjacent refining container for moving the liquefied material thereinto, and spraying means in said refining container for aerating the liquefied material.

2. The refining apparatus of claim 1, wherein the valve means comprises a first and a second valve arranged in the last-named material conduit means, the pump being arranged between said valves, and branch conduits leading from said valves to said refining container.

3. The refining apparatus of claim 2, wherein the last container is connected to said refining container by material conduit means leading from the second valve to the last container.

4. The refining apparatus of claim 1, wherein the containers are of circular cross section and are arranged in tangential contact with the adjacent containers.

5. The refining apparatus of claim 1, further comprising a common drive for the stirring means of the refining and last containers.

6. The refining apparatus of claim 1, further comprising cross bars extending over at least two or said containers, and drive means for the stirring means mounted on said cross bars.

7. The refining apparatus of claim 1, wherein said spraying means comprises a standpipe having an inlet and an outlet in each refining container, said valve means comprising a valve arranged in the last-named material conduit means between the pump and said standpipe inlet, and a spray disc at the standpipe outlet.

References Cited
UNITED STATES PATENTS

| | | | |
|---|---|---|---|
| 2,147,184 | 2/1939 | Aasted | 99—23 |
| 2,469,709 | 5/1949 | Ashworth et al. | |
| 2,889,225 | 6/1959 | Palik. | |

FOREIGN PATENTS 404,572   1/1934   Great Britain.

WALTER A. SCHEEL, Primary Examiner
A. O. HENDERSON, Assistant Examiner

U.S. Cl. X.R.

99—26